United States Patent [19]

Cuminale

[11] Patent Number: 4,799,508
[45] Date of Patent: Jan. 24, 1989

[54] PRESSURE REGULATING VALVE FOR PRESURE COOKER

[75] Inventor: Francesco Cuminale, Santo Andre, Brazil

[73] Assignee: Alcan Aluminio Do Brasil, S.A., Sao Paulo, Brazil

[21] Appl. No.: 81,155

[22] Filed: Aug. 3, 1987

Related U.S. Application Data

[63] Continuation-in-part of Ser. No. 928,674, Nov. 7, 1986, which is a continuation of Ser. No. 758,095, Jul. 23, 1985, abandoned.

[51] Int. Cl.⁴ ............................................. F16K 15/00
[52] U.S. Cl. ..................................... 137/534; 220/203
[58] Field of Search ................. 137/532, 534; 220/203

[56] References Cited

U.S. PATENT DOCUMENTS

| | | | |
|---|---|---|---|
| 1,537,145 | 5/1925 | Shenton | 137/534 |
| 2,524,996 | 10/1950 | Sayers | 137/534 X |
| 2,590,620 | 3/1952 | Holbik | 137/534 |
| 2,633,870 | 4/1953 | Lind | 137/534 |
| 3,949,781 | 4/1976 | Scalabrin | 220/203 X |

Primary Examiner—Robert G. Nilson
Attorney, Agent, or Firm—Christie, Parker & Hale

[57] ABSTRACT

A pressure regulating valve for pressure cookers comprises a tubular projection (1) protruding from a cooker lid (2) and on which a needle (4) is poised, that is mounted to the bottom of an inverted cup shaped cylindrical body (6) provided with an external upper threaded projection (7) on which a head (8) is screwed. Steam escape openings (9) and a lower aperture are surrounded by an internal rim (10) and by an external ferrule (11). The rim is screwed on the end outside thread of the tubular projection (1), and the ferrule supports two selectively used weights, bottom (14) and top (15) defining together a spherical shape in the present device. The cup shaped piece (6) is provided with internal longitudinal channels (17) at the bottom of which there are corresponding steam escaping openings (9). Top weight (15) is calotte shaped and defines a chamber (21) with openings (22) to act as a jet breaker for the escaping steam, and head (8) has blocking projections (23) for the weights that can be aligned in relation to the longitudinal grooves (25 and 26) of the bottom of the weights for removal of the latter.

6 Claims, 1 Drawing Sheet

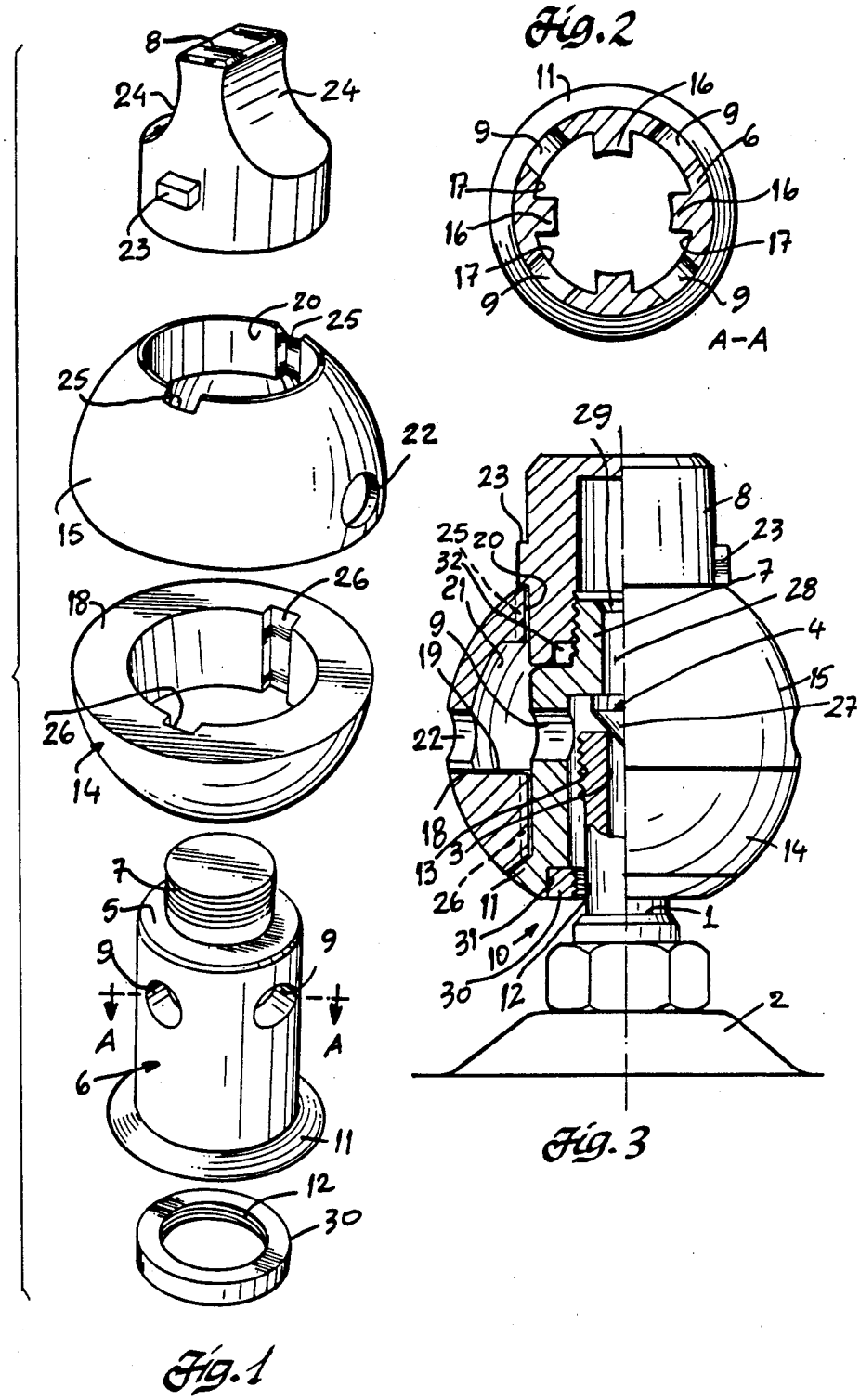

PRESSURE REGULATING VALVE FOR PRESSURE COOKER

CROSS-REFERENCE TO RELATED APPLICATIONS

This application is a continuation-in-part of application Ser. No. 928,674, filed Nov. 7, 1986, which, in turn, is a continuation of application Ser. No. 758,095, filed July 23, 1985, now abandoned.

FIELD OF THE INVENTION

This invention relates to a pressure regulating valve for pressure cookers having improved performance compared with conventional pressure cooker valves.

BACKGROUND OF THE INVENTION

Pressure regulating valves for pressure cookers already known consist essentially of a tubular projection extending from the center of the pressure cooker lid. A needle is positioned on the outwardly turned opening of the projection. This needle is part of a body arranged around the tubular projection and on which weights can be placed to regulate the working pressure inside the cooker. Steam escape openings also are provided.

In the oldest form of construction of this type of valve, as for example, in the D. K. Linde valve shown in U.S. Pat. No. 2,633,870 and others, the shape of the body constituted by the weights does not favor a perfect dynamic balance around the point on which the needle is poised. This is a reason why the valve does not have a satisfactory performance.

In view of solving this problem, the pressure regulating valve of this invention was developed, which consists essentially of a tubular projection protruding from the center of the cooker lid and having an outer opening on which a needle is positioned. The needle extends from the bottom inside surface of a piece formed as an inverted cup inserted around the tubular projection protruding from the lid. On the outside surface of said bottom a threaded projection is provided. Intermediate openings are provided for steam escaping, and around the downward turned aperture said inverted cup piece forms an external flange and another internal flange. The latter has a thread to be screwed on and off on a thread provided outside the free end of the tubular projection protruding from the lid, in order to insert or to remove the inverted cup piece, or to keep it lifted during the depressurizing operations. On the external flange and around the inverted cup piece are placed two outwardly hemispherical weights forming together a spherical body. The external threaded projection in the bottom of the inverted cup piece receives a weight fastening head.

The spherical shape of the valve body, in addition to distinguishing it from other valves, causes the body mass to be uniformly distributed around a supporting central point (needle) giving the whole a better dynamic balance and, consequently, a better performance.

In order to improve the spherical-shaped valve performance, a first improvement was introduced which consisted of providing the internal surface of the inverted cup-shaped piece with longitudinal channels aimed at directing downwardly part of the steam expelled from the circumferential passage defined between the needle and the external opening of the tubular projection extending from the lid which, together with the spherical shape of the valve body, gives the combination a better dynamic balance and, therefore, better valve performance.

Another drawback of many conventional valves is their having weights the same shape causing them to be used inadequately. The spherical shape of the valve body of this invention and the consequent hemispherical shape of its weights prevent inadequate use of same.

Many conventional pressure regulating valves have slanted and downwardly-turned steam escape opening, as well as relatively large one which can make their execution difficult. Those openings are liable to make a certain lack of precision in cutting, which makes it necessary to use some effort when displacing the whole vertically.

The steam escape openings in the pressure regulating valve of this invention are radically disposed, tending to prevent steam that is expelled through same from vertically displacing the valve body and making for easy execution at the manufacturing level.

The slanted and downwardly-turned position of the steam escape openings of the conventional valves are supposed to direct the steam downwards, keeping it from striking the user. Nevertheless, in many cases, part of the expelled steam hits the cooler lid surface, deviates its course, and is dispersed through an arc around the cooker in which it can strike the user.

The horizontal position of the escape openings of the valve of this invention might cause said dispersion through the are around the cooker. In order to avoid this, the escape openings in the inverted cup piece are at a level above the base of the bottom weight and the top weight is given a calotte-shape which, together with the bottom weight base and the outside surface of the inverted cup piece, defined a chamber destined to break the steam jet expelled into the environment through other escape openings provided in the second top calotte shaped weight.

During operation of the valve and as a result of the steam escaping from the interior of the cooker, upper and bottom weights continuously rotate around the inverted cup-shaped body. At some moments only of said rotation, openings provided in the calotte-shaped weight coincide with openings of the inverted cup-shaped body, causing the steam to escape outwardly. During most of the calotte-shaped weight rotation, its openings do not coincide with openings of said inverted cup-shaped body, i.e., they coincide with the inner walls of the upper weight. As a result of such coincidence, steam jets coming from the openings of the inverted cup-shaped body are broken by said walls, thereby reducing their outlet pressure. Thus, because of said difference in phase between openings of said inverted cup-shaped body and openings of said calotte-shaped weight, a continuous breaking of the steam jet is achieved.

Another feature of conventional pressure regulating valves is that a large number of them have the weights fixed on the support through the threading on the weights themselves, or else through pieces destined to fix them on a whole. This prevents and/or makes it difficult to handle the whole during the weight changing operation, especially when the cooker is being used.

With a view to solve the problem, the pressure regulating valve for pressure cookers of this invention has its weights fixed by projections provided in the top head which, when aligned or misaligned in relation to longitudinal grooves provided in the weight openings coupled to the inverted cup piece, allow for the removal or for the positioning of weights, as well as for their fixation on the whole.

In other words, projections provided in the upper head when aligned in relation to the longitudinal grooves provided in the weights, allow for the positioning and for the removal of said top and bottom weights around the inverted cup-shaped body.

However, upon positioning of the weights and as a result of the valve operation, and escape of the steam from the interior of the cooker, said weights undertake a continuous rotation which creates an almost continuous surface in the upper edge of the top weight, upon which projections provided in the head are supported, thus preventing the weights from escaping. Therefore, during operation of the valve, projections provided in the head prevent the weights from escaping.

Another feature of conventional valves is their construction complexity requiring a large number of parts that make valves difficult to manufacture and to clean, at the same time making defects more likely to occur.

In order to solve this problem, the valve, of this invention comprises a small number of parts forming a whole that is easy to manufacture and use and at the same time does not shorten the useful life of the device.

BRIEF DESCRIPTION OF THE DRAWINGS

The attached drawings show the pressure regulating valve for pressure cookers according to principles of this invention, in which:

FIG. 1 shows an exploded view of the valve.

FIG. 2 shows a cross section of the valve taken along line A—A of FIG. 1.

FIG. 3 shows the valve laterally mounted and in partial cross section for clarity.

DETAILED DESCRIPTION

According to what is illustrated in the above mentioned figures, the pressure regulating valve for pressure cooker, making the object of the patent, comprises essentially a tubular projection 1 protruding from the center of a pressure cooker lid 2 on the top of free opening 3, of which a conical needle 4 is poised, that is, internally incorporated to the bottom 5 of a cylindrical body substantially shaped as an inverted cup 6, inside which the tubular projection 1 is housed. On the external surface of said bottom 5, a threaded projection 7 is provided on which a removable head 8 can be screwed. Said inverted cup-shaped body 6 is provided with intermediate steam escape openings 9, its main opening being turned downward and surrounded by internal rim 10 and external ferrule 11, the former being provided on its free edge with a thread 12 that can be screwed on the corresponding thread 13 provided on the top free end of the tubular projection 1 when the cooker is depressurized. On the external ferrule 11, a first bottom weight is poised and on it is a second top weight 15 to be selectively used and arranged around the cup-shaped body 6 and removable head 8.

In this pressure regulating valve, the bottom weight 14 and the top weight 15 are constructed as rings externally coupled to the inverted cup piece 6 and to part head 8, having a truncated spherical external surface and, as a whole, form a spherical body thereby providing a more uniform mass distribution around the point on which the needle rests. This enhances the dynamic balance of the whole when the valve is in use.

The inverted cup-shaped cylindrical body 6 is provided on its inside with a plurality of regularly spaced longitudinal ribs defining intermediate longitudinal channels 17, along which part of the steam escaping through the circumferential passage (defined between the upper aperture 3 of the tubular projection 1 and needle 4) flows downward and toward the bottom opening defined by internal rim 10. At the bottom of said intermediate channels 17, there are corresponding steam escaping openings 9 radially disposed on the inverted cup-shaped body 6 and arranged at a level above the upper surface 18 of the bottom weight 14.

Therefore, when pressure inside the cooker increases to above the level established by bottom 14 and/or top 15 weights, needle 4, together with the whole body forming the valve is pushed away from opening 3 of the tubular projection 1. In this condition steam escapes through the passage formed and in part flows through the escape openings 9 and in part is circulated along the channels 17 coming out through the bottom aperture of the inverted cup-shaped body 6, creating, as it flows along channels 17, together with the spherical shape of the whole forming the valve, a better dynamic stability in order to prevent oscillations.

In the present construction, bottom weight 14 consists of a frustum-spherical piece having a central bore whose diameter coincides with the outer diameter of the inverted cup-shaped body 6, and top weight 15 is shaped as a frustum-spherical calotte having a wider lower opening 19 turned downward on the upper surface 18 of the bottom weight 14 and an upper aperture 20 around head 8, so as to define a ring chamber 21. The ring chamber extends around the cup shaped piece 6. It has radial openings 22 that may or may not correspond to the steam escape apertures 9 of the inverted cup body 6. They break the steam jet passing from the valve, thus keeping it from striking the user of the cooker as will be explained in more detail below.

Removable head 8 has blocking radial projections 23 against which the portoin of top weight 15 which is immediately adjacent to upper opening 20 rests. Head 8 also has its cylindrical outside surface provided with concavities on opposite sides 24 for better handling.

In the upper opening 20 of the top weight 15 and in the bottom weight 14 opening, respectively, longitudinal grooves are provided, 25 and 26, which, when aligned in relation to projections 23 of head 8, allow for the positioning and for the removal of said top and bottom weights on and from the whole, with no need for unscrewing of parts of the whole. This makes the valve easier to handle.

Needle 4 and the bottom inside ring 10 are originally isolated pieces of the inverted cup-shaped cylindrical body 6 in order to facilitate manufacturing of the whole. Needle 4 is formed by a wide tapered head 27, from the base of which a cylindrical extension 28 protrudes, said extension is housed inside the cylindrical extension 29 of the threaded projection 7 of the inverted cup-shaped body 6, thus forming a housing for said cylindrical extension 28. Inside rim 10 is obtained from ring 30 that forms a step 31 on the lower end and inside the inverted cup-shaped body. Between head 8 and external projection 7, there is a ring fitting 32.

The valve, thus constructed, adds better performance, is easier handling, simpler to manufacture and is used as to follows.

In order to determine the pressure at which the cooker should operate, one or two weights, i.e., bottom 14 of top 15 weights, are selectively applied to body 6 and on flange 11 in order to determine a 10 or 15 psi working pressure.

In order to position weights 14 and 15, their respective grooves 25 and 26 should coincide with the blocking radially teeth 23 of head 8. Aftet that, the assembly formed by the invered cup-shaped body 6, bottom weight 14, top weight 15 and head 8 is applied over a tubular projection 1 provided in the pressure cooker lid 2 so that the inner needle 4 of the inverted cup-shaped body 6 in on the upper outlet 3 of the tubular projection 1.

Thus when the inner pressure of the cooker exceeds the limits set forth by weights 14 and 15, needle 4 and the set of pieces attached thereto are moved upwardly, causing release of the steam passage through opening 3 of the tubular projection 1 which was previously sealed by needle 4.

As a consequence of the steam escaping from the interior of the cooker, weights 14 and 15 continuously rotate. The continuous rotation of said weights 14 and 15 creates an almost continuous surface in the upper edge of the top weight 15 on which blocking radially teeth 23 of head 8 are supported, thereby preventing the weights from escaping. Therefore, during operation of the valve, weights 14 and 15 are prevented from escaping by blocking teeth 23 of head 8.

Upwards movement of the needle 4 and of the set of pieces attached thereto causes release of the steam passage through opening 3 of the tubular projection 1, which was previously sealed by needle 4. Part of said steam circulates downwardly through channels 17 of the inverted cup-shaped body 6 and escapes by means of the lower aperture of said body. In its turn, part of the steam escapes through openings 9 of body 6 and reaches the ring-shaped chamber 21 of the top weight 15, while its pressure is reduced by the inner walls of said weight 15. In other words, steam jets which escape through openings 9 hit the inner walls of the top weight 15 and thus break their pressure.

Said steam jet breaking is assured by the following reasons: with the valve operation and continuous rotation of weights 14 and 15 around the inverted cup-shaped body 6, as a result of the steam escaping from the interior of the cooker, openings 22 of the weight 15 coincide for some moments only with openings 9 of body 6, causing the steam to escape outwardly. During most of the weight 15 rotation, its openings 22 do not coincide with openings 9 of body 6. Said openings 22 coincide with the inner walls of weight 15, causing the steam jets coming from openings 9 to be broken by said walls reducing their outlet pressure accordingly.

Therefore, due to difference in phase between openings 22 of weight 15, a continuous breaking of the steam jet is achieved.

While still circulating along channels 17, said portion of steam originates efforts tending to make the valve whole more stable and faster in regulating pressure inside the cooker.

To depressurize the cooker, the whole formed by cup piece 6, bottom 14 and top 15 weights, head 8 should be lifted until inside rim 10 reaches thread 12 level of tubular projection 1, and then the whole is threaded on.

What is claimed is:

1. A pressure regulating valve for a pressure cooker comprising a tubular projection extending from the pressure cooker lid, and on the upper outlet of which is poised a needle, located inside a piece shaped as an inverted cup, inside which said tubular projection is housed, said inverted cup-shaped body having an upper threaded projection in which the head is screwed, said inverted cup-shaped body including steam escape openings and a lower downward turned aperture, surrounded by an internal flange and external ferrule, on which a first weight rests and on this latter a second weight, the weights being placed around the inverted cup-shaped body and the upper head, said weights being selectively used according to the working pressure desired for the cooker, characterized in that the bottom weight and top weight consist of ring pieces set around the inverted cup-shaped body, said weights having a frustum-spherical shape, forming as a whole a spherical valve body, said inverted cup-shaped body being internally provided with a plurality of regularly spaced longitudinal ribs which define longitudinal intermediate channels along which part of the steam escaping from a circumferential passage defined between a top opening of the tubualr projection and a needle circulates downwardly; and in which, at the bottom of said intermediate channels there are corresponding steam escape openings radially arranged on the inverted cup-shaped body and placed at a level above the upper surface of the bottom weight.

2. Apparatus according to claim 1, characterized in that the bottom weight has a frustum-spherical shape and has a central bore whose diameter coincides with the outer diameter of the inverted cup-shaped body, and the top weight is calotte-shaped, having a wider lower aperture turned to the upper surface of the bottom weight and an upper aperture surrounding the head so as to define a ring-shaped chamber around the inverted cup-shaped body and having radially disposed openings which during operation of the valve coincide with openings of the inverted cup-shaped body for some moments, thus causing breaking of the steam jet issuing from the valve.

3. Apparatus according to claim 1, characterized in that a removable head is provided with blocking radially projections against which abuts the portion of the top weight that is immediately adjacent to the upper aperture and has its cylindrical outside surface provided with concave portions opposite to each other; and in which the upper aperture of the top weight and the bottom weight opening are provided with respective opposite longitudinal grooves that can be aligned in relation to projections of the head.

4. Apparatus according to claim 1 characterized in that the needle and the lower inside rim are parts originally isolated from the inverted cup-shaped cylindrical body in order to facilitate manufacturing of the whole, the needle being formed by a wide tapered head from the base of which a cylindrical extension extends to be enclosed inside a cylindrical extension of the threaded projection of the inverted cup-shaped body, forming the housing for said cylindrical extension; and the internal rim being obtained from a ring that forms a step at the lower end and inside the inverted cup-shaped body.

5. Apparatus according to claim 2 characterized in that the needle and the lower inside rim are parts originally isolated from the inverted cup-shaped cylindrical body in order to facilitate manufacturing of the whole, the needle being formed by a wide tapered head from the base of which a cylindrical extension extends to be enclosed inside a cylindrical extension of the threaded projection of the inverted cup-shaped body, forming the housing for said cylindrical extension; and the internal rim being obtained from a ring that forms a step at the lower end and inside the inverted cup-shaped body.

6. Apparatus according to claim 3 characterized in that the needle and the lower inside rim are parts originally isolated from the inverted cup-shaped cylindrical body in order to facilitate manufacturing of the whole, the needle being formed by a wide tapered head from the base of which a cylindrical extension extends to be enclosed inside a cylindrical extension of the threaded projection of the inverted cup-shaped body, forming the housing for said cylindrical extension; and the internal rim being obtained from a ring that forms a step at the lower end and inside the inverted cup-shaped body.

* * * * *